United States Patent
Modera et al.

(10) Patent No.: US 10,100,512 B2
(45) Date of Patent: *Oct. 16, 2018

(54) METHODS FOR SEALING, DETECTION AND MARKING LEAKS IN STRUCTURAL ENCLOSURES

(71) Applicant: THE REGENTS OF THE UNIVERSITY OF CALIFORNIA, Oakland, CA (US)

(72) Inventors: Mark Modera, Piedmont, CA (US); Curtis Harrington, West Sacramento, CA (US); Nelson Dichter, Scotts Valley, CA (US)

(73) Assignee: THE REGENTS OF THE UNIVERSITY OF CALIFORNIA, Oakland, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/276,495

(22) Filed: Sep. 26, 2016

(65) Prior Publication Data
US 2017/0073962 A1 Mar. 16, 2017

Related U.S. Application Data

(63) Continuation of application No. PCT/US2015/023119, filed on Mar. 27, 2015.
(Continued)

(51) Int. Cl.
*F16J 15/02* (2006.01)
*E04B 1/66* (2006.01)
*B05B 7/14* (2006.01)

(52) U.S. Cl.
CPC .............. *E04B 1/66* (2013.01); *B05B 7/14* (2013.01); *F16J 15/02* (2013.01)

(58) Field of Classification Search
CPC ............... F16J 15/02; E04B 1/66; B05B 7/14
See application file for complete search history.

(56) References Cited

U.S. PATENT DOCUMENTS

| 3,472,285 A | 10/1969 | Ginsburgh |
| 3,772,113 A | 11/1973 | Patrick |

(Continued)

FOREIGN PATENT DOCUMENTS

| CN | 1723359 A | 1/2006 |
| EP | 0793543 | 9/1997 |
| WO | 9614166 | 5/1996 |

OTHER PUBLICATIONS

United States Patent and Trademark Office (USPTO), International Search Report and Written Opinion, related PCT International Application No. PCT/US2015/023119, dated Jun. 26, 2015, pp. 1-6, with claims searched, pp. 7-11.

(Continued)

*Primary Examiner* — Gilbert Y Lee
(74) *Attorney, Agent, or Firm* — O'Banion & Ritchey LLP; John P. O'Banion (57) ABSTRACT

A system and method for detecting, marking and/or sealing building envelope leaks in buildings or any enclosed structure. Fogs of aerosolized sealant particles that have a surface tackiness that diminishes over time are introduced into the interior of prepared rooms. The surface properties of the aerosol particles can be controlled with the selection of sealant composition, including the presence and concentration of solvents, the range of produced particle sizes, and the relative humidity and temperature within the enclosure. A pressure differential is created and the micron scale particles adhere to the leak edges and to other particles as they are brought to the leaks and then leave the gas streamlines. Control of particle size, drying rate and particle residence (Continued)

US 10,100,512 B2

Page 2 time in the building interior allows control over the treatment area so that leaks are sealed without leaving a tacky residue.

25 Claims, 1 Drawing Sheet

Related U.S. Application Data (60) Provisional application No. 62/080,961, filed on Nov. 17, 2014, provisional application No. 61/971,101, filed on Mar. 27, 2014.

(56) References Cited

U.S. PATENT DOCUMENTS

| | | | |
|---|---|---|---|
| 4,267,307 A | 5/1981 | Louthan | |
| 4,331,722 A * | 5/1982 | Packo | C08G 77/00 106/287.11 |
| 4,419,163 A | 12/1983 | Yamamoto | |
| 4,439,561 A | 3/1984 | Barber | |
| 4,487,707 A | 12/1984 | Holzknecht | |
| 4,572,846 A | 2/1986 | Foss | |
| 4,612,798 A | 9/1986 | Roberts | |
| 4,635,469 A | 1/1987 | Modera et al. | |
| 4,768,561 A | 9/1988 | Hyodo | |
| 4,994,307 A * | 2/1991 | Price | C09J 4/00 427/236 |
| 5,522,930 A | 6/1996 | Modera et al. | |
| 5,980,984 A | 11/1999 | Modera et al. | |
| 6,492,024 B1 | 10/2002 | Walter | |
| 6,767,395 B2 | 7/2004 | Erick | |
| 6,923,072 B2 | 8/2005 | Modera et al. | |
| 7,156,320 B2 | 1/2007 | Wang et al. | |
| 7,174,791 B2 | 2/2007 | Modera et al. | |
| 7,631,666 B1 | 12/2009 | Ng | |
| 7,851,017 B2 | 12/2010 | Wang et al. | |
| 8,015,998 B2 | 9/2011 | Harris | |
| 9,631,726 B2 * | 4/2017 | Sabotta | F16J 15/02 |
| 9,738,798 B2 * | 8/2017 | Perstnev | C09D 7/1233 |
| 2003/0138558 A1 | 7/2003 | Wang et al. | |
| 2005/0284530 A1 | 12/2005 | McEwan | |
| 2011/0293825 A1 | 12/2011 | Atwal et al. | |
| 2012/0067447 A1 | 3/2012 | Ryan | |
| 2016/0178107 A1 | 6/2016 | Cacciabeve | |
| 2017/0074746 A1 | 3/2017 | Modera | |

OTHER PUBLICATIONS

United States Patent and Trademark Office (USPTO), International Search Report and Written Opinion, PCT International Application No. PCT/US2015/023178, dated Jun. 25, 2015, pp. 1-7, with claims searched, pp. 8-11.

European Patent Office (EPO), extended European search report dated Oct. 10, 2017, replated European application No. 156769767.3, pp. 1-6, with claims searched, pp. 7-9.

European Patent Office (EPO), extended European search report dated Oct. 19, 2017, European application No. 15767999.4, pp. 1-8, with claims searched, pp. 9-11.

State Intellectual Property Office of the People's Republic of China (SIPO), First Review Opinion Notice, dated Apr. 23, 2018, related Chinese patent application No. 201580015734.X, pp. 1-7, machine translation, pp. 8-13, claims examined, pp. 14-17.

* cited by examiner

10

20 — Formulate a Sealant Composition of a Sealant and Optionally at Least One Solvent and an Indicator Material

30 — Secure Points of Access To the Interior Of the Structure To Be Sealed

40 — Create a Pressure Differential between the interior and exterior of The Structure

50 — Generate a Fog of Sealant Particles that Have an Outer Surface With a Tack Range That Diminishes Over Time In The Interior of the Structure

60 — Adhere Sealant Particles From Fog Flowing Out of Enclosure Leaks to Surface Adjacent to Leaks and to Other Particles to Form a Seal

70 — Optionally Generate a Second Fog of Sealant Particles

80 — Optionally Monitor Pressure Differential of the Enclosure to Determine if there are Leaks that are Too Large to Seal.

METHODS FOR SEALING, DETECTION AND MARKING LEAKS IN STRUCTURAL ENCLOSURES

CROSS-REFERENCE TO RELATED APPLICATIONS

This application is a 35 U.S.C. § 111(a) continuation of PCT international application number PCT/US2015/023119 filed on Mar. 27, 2015, incorporated herein by reference in its entirety, which claims priority to, and the benefit of, U.S. provisional patent application Ser. No. 61/971,101 filed on Mar. 27, 2014, incorporated herein by reference in its entirety, and which claims priority to, and the benefit of, U.S. provisional patent application Ser. No. 62/080,961 filed on Nov. 17, 2014, incorporated herein by reference in its entirety. Priority is claimed to each of the foregoing applications.

The above-referenced PCT international application was published as PCT International Publication No. WO 2015/148990 on Oct. 1, 2015, which publication is incorporated herein by reference in its entirety.

STATEMENT REGARDING FEDERALLY SPONSORED RESEARCH OR DEVELOPMENT

This invention was made with Government support under KNDJ-0-40343-00 awarded by the United States Department of Energy. The Government has certain rights in the invention.

INCORPORATION-BY-REFERENCE OF COMPUTER PROGRAM APPENDIX

Not Applicable

BACKGROUND

1. Technical Field

The present technology pertains generally to devices and methods of sealing an enclosure, and more particularly to a remote sealing process that uses aerosolized sealant particles to simultaneously measure, find, and seal leaks in an enclosure (e.g. building envelope shell) in a cost effective manner.

2. Background

The building shell or envelope is the boundary between the conditioned interior of a building and the outdoors. Building shells are often very leaky, causing unintended flows of air between conditioned and unconditioned spaces that result in additional loads for the heating and air conditioning equipment to address, or in the case of larger buildings, causing leakage between zones whose pressure or flow is desired to be controlled (e.g. maintaining negative or positive pressure in hospital or laboratory rooms, or maintaining positive pressurization of commercial buildings in general, or reducing sound or air transport between apartments). The leakage of air into and out of a single-family home can account for 30% or more of the heating and cooling costs of the home. It has been estimated that houses built in the 1990's can have as much as 180 square inches of leakage area for a 1500 square foot home. A tight building envelope can also reduce the infiltration of outdoor pollutants, dust, allergens moisture and noise into the home. Proper sealing of the building envelope can therefore improve energy efficiency as well as maintain a more consistent level of comfort in the home or other building.

A significant effort has been made to reduce the leaks in building shells through current construction practices, but the problem remains one of excess labor costs, constant vigilance, and quality control issues. It is currently very difficult to locate and seal leaks within an enclosure. Existing technologies require manual location and sealing of the leaks. Gaps in seams and joints between walls, ceilings and windows or other structures may not be readily apparent. Gaps between walls or ceilings and electrical boxes, switch boxes and ceiling fixtures and other openings may be covered with a surface plate but still leak air and heat.

Various methods (e.g. smoke and sound) have been tried in the past for locating air leakage paths but it is still very difficult to cost-effectively identify the location of leaks within an enclosure. In multifamily buildings, using guarded fan-pressurization techniques can only determine the bulk leakage through a wall. Infrared thermography has also been used to identify leaks for manual repair in order to maintain air barrier continuity.

Smoke dispensers are routinely used to assist in the visual identification of air leaks by the observation of the movement of the smoke into or out of a seam or gap indicating a leak. Leaks that have been identified are then manually sealed with some material such as caulk, foam or other type of barrier. However, this approach to the identification of air leaks in structures may result in difficulty identifying small fissures or gaps in seams or joints where the flow of air is too slow to visibly influence the smoke, and remains time and labor intensive.

There are various other enclosures that have similar problems with locating and sealing small leaks. Some examples of these include airplane fuselages, building air handlers, heat exchangers, etc.

Accordingly, there is a need for a method for identifying and automatically sealing air leaks in seams and joints, ceiling and wall perforations to improve the air barrier of homes, larger buildings, or other enclosures. The present technology satisfies this need as well as others and is generally an improvement in the art.

BRIEF SUMMARY

The technology described herein provides methods for sealing and/or marking leaks in enclosures of buildings or any enclosed structure (e.g. airplane fuselages, HVAC air handlers, heat exchangers, inflated structures or inflated displays). The methods will allow leaks to be located and sealed remotely and automatically, due to the preferential deposition of particles at the leak sites. In one embodiment, the preferential deposition of particles at leak sites is used to seal the leaks, and in some cases, to mark the leaks so as to indicate the site of the leak. Marked leak sites can then receive a coating of a second sealant to strengthen the seal created by the adhered particles.

The present methods can be used in a variety of settings to create or supplement the air barrier or shell of an enclosed building space such as homes, offices, apartment buildings, warehouses and hotels. The methods can also be used to seal specialized enclosures such as clean rooms, semi-conductor fabrication rooms and laboratories, hospital rooms, or manufacturing rooms that require tightly sealed enclosures to avoid the spread of or entry of contamination. The methods can also be used to identify and seal air leaks in heat exchangers, air handlers, inflated structures or displays, airplanes or similar enclosures.

The methods create a pressure differential across an enclosure and use a fog of aerosolized sealant compositions within or surrounding the enclosure to seal any seams or joints that leak and allow a flow of fog through the leak.

One preferred embodiment includes the use of air atomization, potentially using compressed air to displace the sealant through the atomization nozzles. Another embodiment uses airless atomization to create the sealant particles. Another embodiment uses a multipoint injection system designed to minimize sealant waste. By pressurizing the enclosure with particles that remain reasonably suspended in the air/gas stream until they encounter a leak, the sealant particles can attach to the edges of the leak site as well as to other sealant particles and form a seal. An auxiliary aspect of the technology is the combination of preferential deposition at leaks, with the use of a sealant material that can be detected either from the inside or the outside of the enclosure.

The sealant particles preferably remain suspended as a fog or mist in the enclosure without a carrier gas or bulk air flow within the enclosure. However, in one embodiment oscillating fans are used to assist in keeping the particles suspended and to make the indoor-air particle distribution more uniform. Flows of outside air into the enclosure are often used to assist with creating the pressure differential across the enclosure, and to assist with particle dispersion.

In one embodiment, the sealant composition can have a marker or indicator material for marking the location and size of the leak. If the leak is too large to be fully sealed by the sealant particles, the marked leak site can be manually sealed with caulk or some other form of sealant. The method also allows the leaks to be clearly distinguished, due to the deposition of identifiable particles at the leak sites.

The particle size, particle tackiness, and particle concentration are important factors for the process. The methods use a fog of aerosolized sealant particles within a specific size range that have a specific "tackiness retention" time or "temporal profile of tackiness" so the tack range of the outer surface of the particles diminishes over time.

The sealant compositions that form the fog may be a sealant and optionally at least one solvent and an indicator or marker material. The tack range of particle surfaces can be modulated by controlling the relative humidity, temperature and particle residence time within the enclosure as well as by particle size and particle composition.

In one embodiment, the particles of the proper size range retain their tackiness at least until they reach the leak sites, such that a substantial majority of the particles remain suspended and tacky until the point that they encounter leaks. Moreover, in one embodiment, the pressure is maintained within the proper range such that a substantial fraction of the particles reaching the leaks leave the airstream and deposit on the leak walls or on other deposited particles as the airstream exits through the leak.

The leak marking aspect of this technology includes particles employed to exhibit some characteristic that makes the leak detectable either from inside or outside of the enclosure. For example, the indicator can include the use of fluorescing particles that can indicate the leak size and location using a UV or light source and visual or camera inspection from inside or outside of the enclosure. Alternatively, the deposited particles can produce an emission, or have a unique atomic signature that makes their location observable from inside or outside the enclosure, e.g. by detection of electromagnetic radiation, or MRI.

In another embodiment, the pressure differential between the inside and the outside of the enclosure is monitored and tracked to provide feedback on the progress of the sealing process and/or to evaluate whether there are large leaks that are not going to seal, or if there are large leaks that are going to seal but need a comparatively longer exposure time to seal.

According to one aspect of the technology, a method is provided for automatically sealing or stemming the leaks in building air barriers or reliably identifying the leaks for manual sealing or other remedial action.

Another aspect of the technology is to provide a method for sealing leaky building envelopes with a fog of sealant particles that have a tack range that diminishes over time.

According to another aspect of the technology, a method for sealing building enclosures is provided using a multipoint injection system designed to minimize sealing time and sealant waste.

Another aspect of the technology is where the sealing conditions are controlled by manipulating particle size, particle composition, enclosure humidity, temperature and/or sealant or air flow rate.

A further aspect of the present technology is to provide a method for sealing leaks in building shells that is reliable, simple and inexpensive to implement.

Further objects and aspects of the technology will be brought out in the following portions of the specification, wherein the detailed description is for the purpose of fully disclosing preferred embodiments of the technology without placing limitations thereon.

BRIEF DESCRIPTION OF THE SEVERAL VIEWS OF THE DRAWINGS

The technology described herein will be more fully understood by reference to the following drawing which is for illustrative purposes only.

DETAILED DESCRIPTION

Figure 1:
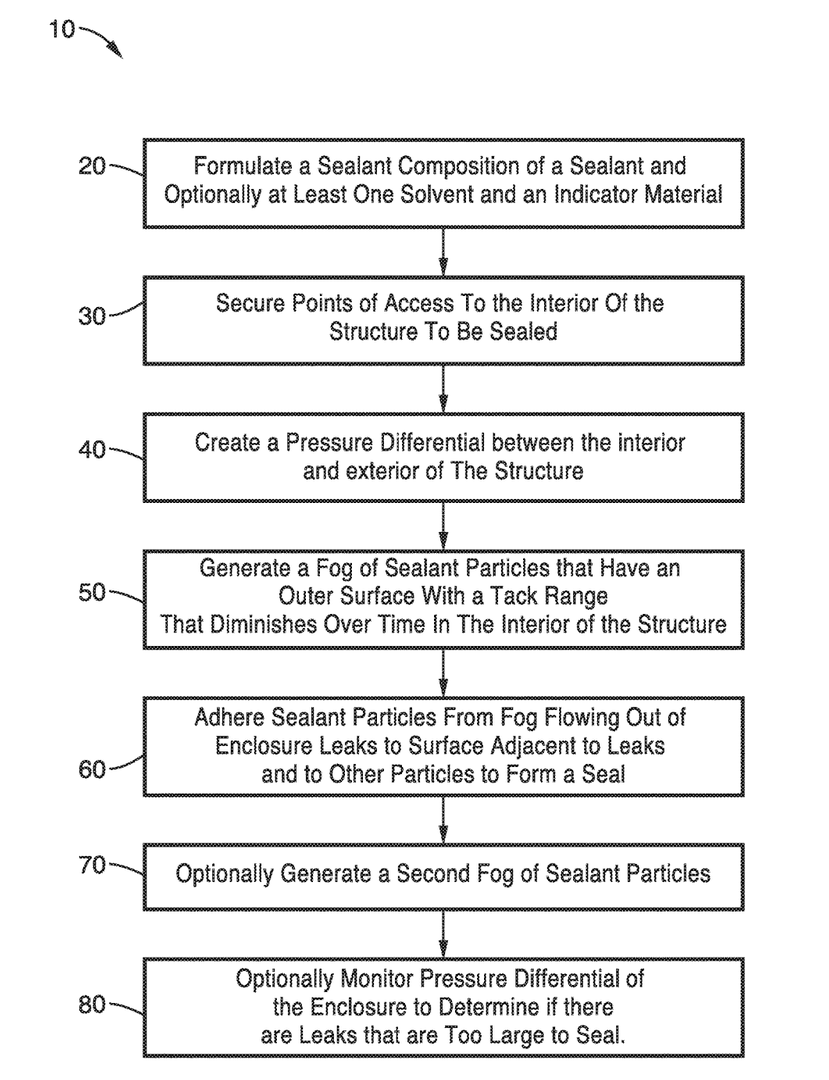
FIG. 1 is a schematic flow diagram of a method of sealing leaks in an air barrier of an enclosure according to one embodiment of the technology.

Referring more specifically to the drawings, for illustrative purposes, embodiments of the apparatus and methods for sealing leaks in the air barrier of structures using atomized sealant compositions of the technology described herein are described generally in FIG. 1. It will be appreciated that the methods may vary as to the specific steps and sequence and the apparatus may vary as to structural details without departing from the basic concepts as disclosed herein. The method steps are merely exemplary of the order that these steps may occur. The steps may occur in any order that is desired, such that it still performs the goals of the claimed technology.

Turning now to FIG. 1, a flow diagram of one embodiment of a method 10 for sealing the air barrier of a structure is set forth. At block 20 of method 10, the sealant composition is selected and acquired. The sealant composition may be a sealant material alone or can be mixed with one or more solvents. The sealant compositions that are formulated may also include one or more types of marker or indicator materials that can be used to identify the location of a leak.

Suitable sealants can be atomized and the atomized sealant particles can adhere to the edges of a leak and to each other to form a seal. Preferred sealants include various compounds that can either have good elongation properties after drying and/or can provide rigid solid seals that can have structural properties. One example of sealants that work well is water-based acrylic polymer sealants. Other additives include white mineral oil, amorphous silica and titanium dioxide, each 1.0-5.0% by weight.

The sealant composition that is formulated at block 20 may optionally include one or more solvents that can facilitate the aerosolization process and produce sealant particles of a desired size or within a range of sizes. The selection of the optional solvents that are available for use will be influenced by the sealant that is selected and on its volatility. This selection of sealants and solvents also allows temporal control over the tack range of the aerosolized sealant particles. Some examples of sealant modifications that have been shown to increase the duration of tackiness include the addition of acetone or p-chlorobenzotrifluride, or the use of an acrylic polymer that has no rheological fillers.

Tackiness at the time of contact of the particles at the leak site can be described by the adhesive and cohesive properties of the sealant. These properties can be regulated to have desired characteristics at a certain distance from or time from leaving the aerosol injector. For example, the tack range timeframe can be increased or decreased with the proper selection of at least one solvent to go along with the sealant material that is selected. Control over tackiness versus time can also be exerted, in part, by controlling the humidity and temperature during the injection period so as to control the evaporation of the solvent from the sealant.

The characteristics of the aerosolized sealant particles that are produced will also be influenced by the percentage of sealant to solvent or sealant-indicator to solvent that is present in the final sealant composition. The preferred sealant compositions have roughly 20% to roughly 25% solids. In another embodiment, the sealant composition has between approximately 10% to approximately 35% solids. However, if the atomizer that is used is capable of creating small particles, the sealant composition can be up to approximately 70% solids, or if very small particles are desired as little as approximately 5% solids.

The sealant composition may also include an indicator or marker material that will allow visualization or detection of the sealant material that has been deposited and the size and location of the leaks. For example, the indicator material that is part of the sealant composition is one that can be observed visually, such as a colored dye, solid or fiber. The indicator material can also be observable by exposure to infra-red or ultra-violet light such as with phosphorescent or fluorescent materials. Alternatively, the deposited particles can produce an emission, or have a unique atomic signature that makes their location observable from inside or outside of the enclosure such as by detection of electromagnetic radiation, or MRI.

A building structure to be sealed can be treated room by room or as an entire structure. The sealing process begins by securing points of access for pressurization or depressurization equipment, such as doors, windows or other intentional openings at block 30 of FIG. 1.

In addition, certain building components, such as openable windows or air-conditioning system vents, are isolated from exposure to aerosols using a substantially air-impermeable barrier such as tape or plastic sheets The purpose of securing windows and doors with a tape barrier is to avoid sealing parts of the structure that will be opened regularly. Furthermore, large openings such as rough openings for windows or doors can be blocked temporarily with rigid materials or materials that can withstand the required pressure differentials to allow the creation of a pressure differential between the outside and the inside of the building or room. In addition, finished floors or rugs, countertops and other horizontal surfaces that should not be exposed to sealant are covered to protect them from sealant particles that can settle out by gravity.

Once the points of access to the structure are secured at block 30, the enclosure to be treated is pressurized to create a pressure differential at block 40. The preferred pressure differential across the enclosure is within a specific range of between approximately 10 Pa and approximately 1000 Pa. A pressure differential between approximately 25 Pa and approximately 200 Pa is also preferred and a pressure differential between approximately 50 Pa and approximately 150 Pa is particularly preferred.

In one embodiment, a fan that has an airflow that can be tracked and/or controlled is preferably used to pressurize the enclosure. The fan can be a calibrated fan, such that the flow rate at any given time during the process can be monitored and regulated. For example, the fan can be controlled so as to maintain a fixed flow that is independent of pressure. The fan can also be controlled to maintain a fixed pressure differential across the enclosure over time. The control of the pressure within the enclosure at block 40 can also be accomplished with several fans or supplemented with other types of air sources such as compressed air.

A fog or mist of aerosolized sealant composition particles is generated at block 50 of FIG. 1 and dispersed into the interior of the enclosure. The aerosol fog can be generated from a single source or with multiple sources or dispensers in different rooms. In one embodiment, the fog is generated with nozzles with multiple orifices. In one embodiment, the fog of sealant particles are generated near interior surface joints in the interior of the enclosure using independent injectors. In another embodiment, the sealant particles are distributed in the air stream associated with a distribution fan. Independent injectors can also use the pressurization fan or independent mixing fans to disperse aerosols in the enclosure. Independent injectors can also use compressed air nozzles or airless nozzles to disperse aerosols in the enclosure.

In another embodiment, the particles are generated outside of the enclosure and then introduced to the inside of the enclosure. In another embodiment, the particles are generated outside the enclosure and then sucked into the enclosure by depressurizing the enclosure relative to the space in which the particles are generated to introduce them into the interior of the enclosure.

Air and liquid flow rate through the nozzles can also be used to adjust the size of the particles forming the fog. If particles are too big, then they will fall to the ground and will not engage the leaks. If the aerosol particles are too small, the particles will go through the leaks with the air stream and not form a seal. Sealing can be performed with polydisperse aerosols with a particle size range from approximately 2 microns to approximately 20 microns in diameter. However, a fog with aerosol particles that have a mean particle diameter between about 4 microns to about 8 microns is particularly preferred. However, the aerosol fog particles generally reduce in size after formation as the solvents evaporate, with the size derivative depending on the rate of evaporation, and therefore environmental conditions.

The sealant particles are formed to have an outer surface that has a tack that diminishes over time. By definition, tack is the propensity of a material to adhere instantaneously to a surface with a bond of measurable strength when it is brought in contact with the surface with very light pressure. Tack range is defined as the period of time that the particle surface has a tack bond state that will adhere to leak surfaces and other particles to form a seal.

The surface properties of the aerosol particles of the fog can be controlled with the selection of sealant composition, including the presence and concentration of solvents, the range of particle sizes that are produced, and the relative humidity and temperature within the interior of the enclosure or the surrounding zone if the enclosure is being depressurized. By selecting the parameters of the process elements carefully, it is possible to temporally control the tack of the aerosol particles to have a desired approximate tack duration. Aerosol particles essentially have a "tackiness" lifespan and the particles will no longer adhere to surfaces or to each other after a period of time. Therefore, flow control of the aerosol particles and the temporal control over the tack of the particles will allow control over the time when the particles will stick to a leak and when the particles will not stick.

Therefore, the tack range of the fog that is generated can be adapted to the conditions of the particular structure to be treated. The selected sealant particles will retain surface tackiness for long enough to seal the leaks with a seal of adequate strength but not create a seal whose strength is limited by poor cohesion between particles.

After a period of time, the seal formed from sealant particles will also lose its residual tackiness so that the seal cannot be peeled off or collect dust. In addition, airborne aerosol particles that have not participated in the sealing of the leaks will not leave a tacky residue on floors and other surfaces.

The preferred amount of time for the particles to remain in a tacky state is on the order of approximately one minute to approximately 24 hours for a newly constructed home. The high end of this range is appropriate for a newly constructed building (or any other enclosure that is insensitive to tack time). The low end of this range is appropriate for any other enclosure that is sensitive to tack time (e.g. an inflatable structure or display). However, approximately 5 minutes to approximately 1 hour is particularly preferred for an existing building.

One way to control tackiness versus time is to add a solvent with lower volatility, such that it will not dry out completely for the particle sizes of interest over the time and distance scales of interest. This can be done with sealants that are principally water based (i.e. even when water is the principal solvent). This can also be done with solvents that evaporate more slowly from the small blobs of sealant.

Essentially, the drying process treats the sealant particles as little balls or blobs that have a certain saturated vapor pressure of water and other solvents at their surface. If the solvent is evaporated too quickly, the particles look like Styrofoam when they reach the leak as opposed to sticky particles that coalesce to form a nice continuous seal.

Controlling the environment in the enclosure being sealed can also impact tackiness versus time and particle flow distance. The selection of the appropriate humidity and temperature may depend upon particle size, with larger particles taking longer to lose their tackiness but not travelling as far as smaller particles.

Relative humidity in the enclosure during injection can be controlled by sensing the % RH and then regulating the sealant flow rate during injection in the enclosure or heating/cooling the air in the enclosure. For example, tackiness versus time can be controlled by controlling the humidity and temperature during the injection period so as to control evaporation of solvent from the sealant. This is most effective for water-based sealants.

The preferred relative humidity in the enclosure or in the external atomization space is controlled to be within the range of approximately 65% RH and approximately 95% RH. Optionally, the relative temperature in the enclosure or external atomization space is controlled to be within the range of approximately 30° F. and approximately 110° F. Control of the temperature impacts the relative humidity and therefore the evaporation rate. In another embodiment, the dew point, absolute humidity or the partial pressure are controlled instead of the relative humidity.

At block 60 of FIG. 1, the sealant particles adhere to the surface edges of the leaks and to other sealant particles to form a seal. Because a differential pressure has been created across the enclosure, the pressurized interior air will flow out of any leaks in the air barrier of the structures through seams, joints and any other enclosure openings. The aerosol particles in the fog are entrained in the flow moving out through the leaks.

Since the aerosol particles are sufficiently small to be responsive to the low pressure differential, they move with the air at low acceleration rates and are drawn to the leaks with the air. However, the higher acceleration rates associated with the accelerated flow created by the pressure differential maintained across the leaks causes the particles to leave the streamlines near the leak, thereby impacting and adhering to the surfaces of the leak edges and to other particles previously deposited, gradually building up to form a seal.

The size of the pressure differential will impact the shape and look, as well as the strength of the seals that are produced. Higher pressures produce higher velocities and accelerations of particles that will result in the deposition of sealant on surfaces surrounding the leak. Higher pressure will allow more sealant to adhere on and around the leak site which could improve the durability of the seal. At very low pressures, the velocities and accelerations can be too low to cause the particles to leave the air streamlines and impact the leak edges.

The time for the aerosol particles to reach a leak can be controlled by the placement of injectors within the enclosure. Normally, the particles can remain suspended without a carrier air or gas flow within the enclosure. However, in one embodiment, the time for particles to reach a leak can be shortened by adding mixing devices or fans in the enclosure. These fans assist in moving sealant aerosol particles of the fog in proximity to the joints and other openings in the enclosure that need to be sealed and to be entrained in the air flow produced by the pressure differential across the leaks.

At block 70 of FIG. 1, an optional second or third fog of aerosol particles of different materials or different sized particles can be created and introduced into the interior of the enclosure. It can be seen that a variety of materials with a variety of characteristics can be aerosolized sequentially to create a single fog or sequential fogs that are used to fill leaks, Thus, the sealing can be accomplished with a two-step or three-step process, for example, with fogs of particles of differential characteristics.

In one embodiment, a first fog of particles that retain their tackiness until some period after they reach the leak is created, followed by particles that do not need to be tacky, potentially followed by another fog of tacky particles at the end. In another embodiment, a fog of a first type of sealant particles of a larger size range is introduced and followed after a period of time with a fog of a second sealant with particles of a smaller size range to complete the seal. In another embodiment, single fog that is produced with nozzles producing different sized aerosol particles so that the leaks are exposed to particles of a range of sizes and the seal is ultimately formed from different sized particles.

At block 80 of FIG. 1, the pressure differential across the entire enclosure or specific seams can be monitored to determine whether there are leaks that are too large to seal. Monitoring of the pressure differential of the enclosure over time can also provide an indication of the effectiveness of the sealing process and whether additional time or an increase in pressure is needed or if further treatment is unnecessary.

In one embodiment, the pressure differential is monitored and computer software is used to compute the amount of leakage in real time for the sealing process, based on the measured pressure differential across the enclosure and the flow through the pressurization fan. Software equations can calculate the size of leak as a function of pressure and flow.

In another embodiment, pressure differential monitoring can allow an overall leakage target to be set. When the target is reached, the process can be manually or automatically stopped. Monitoring of the pressure differential will also avoid the excessive production and introduction of sealant aerosols into the enclosure resulting in unnecessary cost.

Graphing of leakage flow versus time allows the determination of the presence of large leaks. When the sealing rate (derivative) drops off, then a large leak is indicated. If the amount of leakage versus time flat lines, then a large leak that is not going to seal is indicated.

The technology described herein may be better understood with reference to the accompanying examples, which are intended for purposes of illustration only and should not be construed as in any sense limiting the scope of the technology described herein as defined in the claims appended hereto.

Example 1

In order to demonstrate the operational principles of the apparatus and sealing methods, an enclosure with 8 ft×8 ft×4 ft (2.4 m by 2.4 m by 1.2 m) dimensions with 12-inch by 12-inch (30 cm by 30 cm) leak panels distributed at various locations around the shell of the enclosure was constructed for laboratory testing. The approximate size of each leak in a panel was 0.1 to 0.12 inch×10 inch×0.125 inch (2.5 to 3 mm by 25 cm by 3 mm) (H×W×D) and there were six leaks on each leak panel. The height and width of each leak (0.125 to 0.12 inch (2.5 to 3 mm)) was meant to be representative of a typical leak in a building shell, but the depth (0.125 inch (3 mm)) was much shorter than what is expected to be found in buildings. The total measured leakage for all panels was approximately 41 square inches (260 cm$^2$) of open leakage area. A 14-inch (36 cm) diameter hole was also used as the injection site to introduce the sealant fog near the top of the enclosure.

The performance of the remote sealing technology was evaluated using three primary metrics: 1) the time needed to seal the enclosure, 2) particle deposition inside the enclosure, and 3) the uniformity of sealant deposition at the leaks. The parameters evaluated included the pressure inside the enclosure, the flow rate of sealant injected, and the size of the particles injected.

The aerosol generating apparatus included instrumentation for measuring differential pressure between the enclosure and ambient, as well as for measuring the air flow, thereby facilitating continuous monitoring of leakage area during the sealing process.

The leakage area was computed using the following equations:

$$Q = ELA_{ref} \times \sqrt{\frac{2 \times \Delta P_{ref}}{\rho}} \times \left(\frac{\Delta P}{\Delta P_{ref}}\right)^n$$

$$LA = \frac{ELA}{0.6}$$

where Q is the measured airflow rate, $ELA_{ref}$ is the effective leakage area, $\Delta P$ is the pressure measured across the leak, $\Delta P_{ref}$ is a reference pressure (chosen to be 25 Pascals), $\rho$ is the air density, n is the flow exponent (typically 0.5 for an orifice), and is the leakage area. The $ELA_{ref}$ of a leak is the area of a sharp-edged orifice that at some reference pressure that will produce the same flow as the leak at that pressure. It has also been shown experimentally and theoretically that the ELA is related to the actual area of an orifice by a factor of 0.6.

The performance of each test was evaluated using leakage versus time profiles, as well as analyses of sealant use efficiency quantified by the mass balance of sealant materials (i.e. fraction on floor, in leaks, on walls, and lost through leaks). The independent variables investigated included the average particle size (controlled by sealant dilution), the enclosure pressure control and the sealant injection rate. The dependent variables that were used to quantify performance included the sealing rate, the sealing uniformity (comparison of the amount of sealant deposited on panels in different locations), and the sealant use efficiency (fraction that settled on the floor and other surfaces, versus deposited in leaks).

All tests successfully sealed the enclosure to nearly zero leakage in less than 30 minutes. The leakage profiles indicated that the sealant injection rate had a significant impact on sealing time, whereas controlling the pressure inside the enclosure had a less significant impact. Tests performed at a 25 cc/min injection rate at various pressures all sealed the enclosure in 13-15 minutes, whereas injecting sealant at 100 cc/min sealed the enclosure in six minutes. Reducing sealant particle size by diluting the sealant with water also significantly extended the sealing time. This is due to the reduced solid sealant injection rate associated with diluting without adjusting the pump rate. In the test with diluted sealant, the enclosure sealed in approximately 28 minutes.

The sealant deposition pattern was shown to be a quick indication of the sealant deposition efficiency. Sealant deposition patterns were observed during three different tests, a) a high-pressure test with 100 cc/min sealant injection rate, b) a high-pressure test with 25 cc/min sealant injection rate, and c) a test at 25 cc/min sealant injection rate, but with the pressure differential controlled to maintain 50 Pa. The largest spread of sealant around the leak was seen in the high-pressure test at 100 cc/min, and this spread decreased when the sealant injection rate was reduced, and when the pressure differential was maintained at 50 Pa. These results suggest that excess deposition is reduced, producing cleaner seals, when the sealant flow rate is reduced (which produces smaller particles), and when the building enclosure pressure differential is reduced (which reduces velocities around the entrance to the leaks). The reduction in excess deposition may be due to the size of the particles created by the nozzle used for these experiments, and the lower velocities around the leaks at lower pressures. In terms of spatial uniformity in the lab tests, there was only a 1-2% variation in the mass of sealant deposited between any of the leak panels distributed around the enclosure at any given sealant flow, suggesting very good particle distribution and sealing uniformity for all of the lab tests that were performed.

Typical pressure profiles inside the enclosure were observed for tests with no pressure control, and tests controlled at 100 Pa and 50 Pa. The pressure was regulated by a calibrated fan that controlled the airflow delivered to the test enclosure. Three operating pressures were studied in the small-scale tests: 1) no pressure control (which effectively allows the fan curve to control the injection flow), 2) manual flow control to maintain a 100 Pascal pressure differential, and 3) manual flow control to maintain a 50 Pascal pressure differential.

The sealant distributions showed how pressure control affected the sealing process. There was a clear trend showing that lower enclosure pressure leads to less sealant deposited in and around the leaks, more sealant depositing on the floor, less sealant depositing on the walls and ceiling, and more sealant getting blown through the leaks. Although much of the injected sealant was blown through the leaks, it is expected that the geometry of leaks in typical buildings will be different than in the test enclosure. The typical building leaks that can be sealed with this process are found at the joints and seams between building materials that are much deeper than the leaks tested in the lab enclosure. The longer flow path of typical leaks in buildings is expected to reduce the amount of sealant that is blown through the leaks and, therefore, improve the efficiency of the sealant application process.

Example 2

To further demonstrate the operational principles of the apparatus and sealing methods, field testing in the dry-wall phase of construction and on an empty existing home was conducted. Based upon the laboratory and field test results, aerosol particles can be employed to seal leaks in building envelopes.

The initial full-scale tests of the aerosol-based sealing technology were performed using the existing aerosol duct sealing technology that was tested in the laboratory experiments described in Example 1. Later full-scale tests used a multiple aerosol injection points with airless atomization and compressed air or fans to disperse sealant fog into the structures. However, a carrier gas was not required.

Access points in the rooms to be tested, such as windows, doors and duct openings, were secured with a substantially airtight barrier such as tap or plastic sheets so that a pressure differential could be established in the structure and so that the access points would not be sealed by the process.

The first full-scale tests demonstrated a lack of sealant transport to adjoining rooms which required that the atomization nozzle be moved from room to room. The aerosol injection system that is capable of multiple injection points allowed nozzles to be distributed throughout the building both expediting the sealing process and eliminating the need to enter the building while applying the aerosol.

The lab tests suggest that lower sealant injection rates result in cleaner seals that may be due to smaller particles created by the lab-test nozzle at lower sealant injection rates. The tests also suggest that a smaller pressure differential across the leaks creates an even cleaner seal, most likely due to lower approach velocities of the particles to the leaks.

In the field, in both the new construction and existing home applications, the process was able to seal at least 50% of the leakage observed prior to injection within a reasonable amount of time. Leaks that were sealed during the field testing included leaks at sill plates and electrical boxes.

The field tests of the sealing process also showed that the floors did not need to be prepped in new-construction applications. However, the tests also showed that particular care needs to be taken in existing homes, even if they are empty of contents at the time of sealing (e.g. protecting carpeted stairways from more than just particle settling).

From the discussion above it will be appreciated that the technology described herein can be embodied in various ways, including the following:

1. A method of sealing leaks in an enclosure, the method comprising: a) securing points of access to the interior of an enclosure with substantially airtight barriers; b) generating a pressure differential between the interior and exterior of the enclosure; c) creating a fog of particles of a sealant in the interior of the enclosure, the particles having an outer surface with a tack range that diminishes over time; and d) adhering sealant particles from fog flowing out of enclosure leaks to surfaces adjacent to leaks and to other particles to form a seal; e) wherein sealant particles that do not form a seal will not adhere to interior surfaces of the enclosure or to other particles after a period of time.

2. The method of any preceding embodiment, further comprising: formulating a sealant composition of a sealant and at least one solvent; and aerosolizing the sealant composition to produce a fog of sealant particles.

3. The method of any preceding embodiment, wherein the solvent is selected from the group of solvents consisting of water, of acetone and p-chlorobenzotrifluride.

4. The method of any preceding embodiment, wherein the sealant composition comprises a composition of approximately 5% to approximately 70% solids to solution for aerosolization.

5. The method of any preceding embodiment, further comprising: controlling the tack range of the sealant particles with a solvent of low volatility.

6. The method of any preceding embodiment, further comprising: controlling the tack range of the sealant particles by controlling the temperature and humidity of the environment surrounding a source of sealant particles; and controlling the particle size of the sealant particles.

7. The method of any preceding embodiment, wherein the relative humidity is controlled to be within the range of approximately 65% RH and approximately 95% RH.

8. The method of any preceding embodiment, wherein the temperature is controlled to be within the range of approximately 40° F. and approximately 110° F.

9. The method of any preceding embodiment, wherein the sealant particles have a mean particle diameter within the range of approximately 2 microns to approximately 20 microns.

10. The method of any preceding embodiment, wherein the sealant particles have a mean particle diameter within the range of approximately 4 microns to approximately 8 microns.

11. The method of any preceding embodiment, wherein the pressure differential in the enclosure is maintained within the range of approximately 10 Pa and approximately 1000 Pa.

12. The method of any preceding embodiment, further comprising: monitoring the pressure differential across and flow into the enclosure to determine if there are leaks that are too large to seal.

13. The method of any preceding embodiment, further comprising: monitoring the pressure differential across and flow into the enclosure to determine the progress of the sealing process.

14. The method of any preceding embodiment, further comprising: formulating a sealant composition of at least one solvent, a sealant and an indicator; and aerosolizing the sealant composition to produce the sealant particles.

15. The method of any preceding embodiment, wherein the indicator is selected from the group consisting of colored dyes, colored fibers, fluorescent dyes and phosphorescent dyes, wherein the location of the seals in the enclosure are identified by the indicator.

16. The method of any preceding embodiment, further comprising: introducing a second fog of particles into the interior of the enclosure after the fog of sealant particles, the second fog comprising a second material; wherein particles of the second material adhere to the particles of sealant at a leak site.

17. The method of any preceding embodiment, further comprising: introducing a third fog of particles into the interior of the enclosure after the second fog, the third fog comprising a second sealant.

18. A method of sealing leaks in an enclosure, the method comprising: a) securing points of access to the interior of an enclosure with substantially airtight barriers; b) generating a pressure differential between the interior and exterior of the enclosure; c) formulating a sealant composition of a sealant and at least one solvent; d) creating a fog of particles of a sealant in the interior of the enclosure with a mean particle diameter within the range of approximately 2 microns to approximately 20 microns, the particles having an outer surface with a tack range that diminishes over time; and e) adhering sealant particles from fog flowing out of enclosure leaks to surfaces adjacent to leaks and to other particles to form a seal; f) wherein sealant particles that do not form a seal will not adhere to interior surfaces of the enclosure or to other particles after a period of time.

19. The method of any preceding embodiment, further comprising: controlling the relative humidity to be within the range of approximately 65% RH and approximately 95% RH.

20. The method of any preceding embodiment, further comprising: controlling the relative temperature in the interior of the enclosure to be within the range of approximately 40° F. to approximately 110° F.

21. The method of any preceding embodiment, wherein the pressure differential in the enclosure is maintained within the range of approximately 10 Pa and approximately 1000 Pa.

22. A method of sealing leaks in an enclosure, the method comprising: a) securing points of access to the interior of an enclosure with substantially airtight barriers; b) generating a pressure differential between the interior and exterior of the enclosure; c) formulating a sealant composition of a sealant and at least one solvent; d) creating a fog of particles of a sealant in the interior of the enclosure, the particles having an outer surface with a tack range that diminishes over time; e) controlling the relative humidity within the interior of the enclosure; f) adhering sealant particles from fog flowing out of enclosure leaks to surfaces adjacent to leaks and to other particles to form a seal; and g) monitoring the pressure differential across and flow into the enclosure to determine the progress of the sealing process; h) wherein sealant particles that do not form a seal will not adhere to interior surfaces of the enclosure or to other particles after a period of time.

23. The method of any preceding embodiment, further comprising: controlling the size of the sealant particles to have a mean particle diameter within the range of approximately 2 microns to approximately 20 microns.

24. The method of any preceding embodiment, the sealant composition further comprising: an indicator, the indicator selected from the group consisting of colored dyes, colored fibers, fluorescent dyes and phosphorescent dyes, wherein the location of the seals in the enclosure are identified by the indicator.

25. The method of any preceding embodiment, further comprising: applying an additional layer of sealant on leaks identified by the presence of the indicator.

Although the description herein contains many details, these should not be construed as limiting the scope of the disclosure but as merely providing illustrations of some of the presently preferred embodiments. Therefore, it will be appreciated that the scope of the disclosure fully encompasses other embodiments which may become obvious to those skilled in the art.

In the claims, reference to an element in the singular is not intended to mean "one and only one" unless explicitly so stated, but rather "one or more." All structural, chemical, and functional equivalents to the elements of the disclosed embodiments that are known to those of ordinary skill in the art are expressly incorporated herein by reference and are intended to be encompassed by the present claims. Furthermore, no element, component, or method step in the present disclosure is intended to be dedicated to the public regardless of whether the element, component, or method step is explicitly recited in the claims. No claim element herein is to be construed as a "means plus function" element unless the element is expressly recited using the phrase "means for". No claim element herein is to be construed as a "step plus function" element unless the element is expressly recited using the phrase "step for".

What is claimed is:

1. A method of sealing leaks in an enclosure, the method comprising:
   (a) securing points of access to the interior of an enclosure with substantially airtight barriers;
   (b) generating a pressure differential between the interior and exterior of the enclosure;
   (c) creating a fog of particles of a sealant in the interior of the enclosure, said particles having an outer surface with a tack range that diminishes over time; and
   (d) adhering sealant particles from fog flowing out of enclosure leaks to surfaces adjacent to leaks and to other particles to form a seal;
   (e) wherein sealant particles that do not form a seal will not adhere to interior surfaces of the enclosure or to other particles after a period of time.

2. The method of claim 1, further comprising:
   formulating a sealant composition of a sealant and at least one solvent; and
   aerosolizing the sealant composition to produce a fog of sealant particles.

3. The method of claim 2, wherein said solvent is selected from the group of solvents consisting of water, of acetone and p-chlorobenzotrifluride.

4. The method of claim 2, wherein said sealant composition comprises a composition of approximately 5% to approximately 70% solids to solution for aerosolization.

5. The method of claim 2, further comprising controlling the tack range of said sealant particles with a solvent of low volatility.

6. The method of claim 1, further comprising:
   controlling the tack range of said sealant particles by controlling the temperature and humidity of the environment surrounding a source of sealant particles; and
   controlling the particle size of the sealant particles.

7. The method of claim 6, wherein the relative humidity is controlled to be within the range of approximately 65% RH and approximately 95% RH.

8. The method of claim 6, wherein the temperature is controlled to be within the range of approximately 40° F. and approximately 110° F.

9. The method of claim 1, wherein the sealant particles have a mean particle diameter within the range of approximately 2 microns to approximately 20 microns.

10. The method of claim 1, wherein the sealant particles have a mean particle diameter within the range of approximately 4 microns to approximately 8 microns.

11. The method of claim 1, wherein the pressure differential in the enclosure is maintained within the range of approximately 10 Pa and approximately 1000 Pa.

12. The method of claim 1, further comprising monitoring the pressure differential across the enclosure and flow into the enclosure to determine if there are leaks that are too large to seal.

13. The method of claim 1, further comprising monitoring the pressure differential across the enclosure and flow into the enclosure to determine the progress of the sealing process.

14. The method of claim 1, further comprising:
formulating a sealant composition of at least one solvent, a sealant and an indicator; and
aerosolizing the sealant composition to produce said sealant particles.

15. The method of claim 14, wherein said indicator is selected from the group consisting of colored dyes, colored fibers, fluorescent dyes and phosphorescent dyes, wherein the location of the seals in the enclosure are identified by the indicator.

16. The method of claim 1, further comprising:

introducing a second fog of particles into the interior of the enclosure after the fog of sealant particles, the second fog comprising a second material;

wherein particles of the second material adhere to the particles of sealant at a leak site.

17. The method of claim 16, further comprising introducing a third fog of particles into the interior of the enclosure after the second fog, the third fog comprising a second sealant.

18. A method of sealing leaks in an enclosure, the method comprising:

(a) securing points of access to the interior of an enclosure with substantially airtight barriers;

(b) generating a pressure differential between the interior and exterior of the enclosure;

(c) formulating a sealant composition of a sealant and at least one solvent;

(d) creating a fog of particles of a sealant in the interior of the enclosure with a mean particle diameter within the range of approximately 2 microns to approximately 20 microns, said particles having an outer surface with a tack range that diminishes over time; and (e) adhering sealant particles from fog flowing out of enclosure leaks to surfaces adjacent to leaks and to other particles to form a seal;

(f) wherein sealant particles that do not form a seal will not adhere to interior surfaces of the enclosure or to other particles after a period of time.

19. The method of claim 18, further comprising controlling the relative humidity to be within the range of approximately 65% RH and approximately 95% RH.

20. The method of claim 18, further comprising controlling the relative temperature in the interior of the enclosure to be within the range of approximately 40° F. to approximately 110° F.

21. The method of claim 18, wherein the pressure differential in the enclosure is maintained within the range of approximately 10 Pa and approximately 1000 Pa.

22. A method of sealing leaks in an enclosure, the method comprising:

(a) securing points of access to the interior of an enclosure with substantially airtight barriers;

(b) generating a pressure differential between the interior and exterior of the enclosure;

(c) formulating a sealant composition of a sealant and at least one solvent;

(d) creating a fog of particles of a sealant in the interior of the enclosure, said particles having an outer surface with a tack range that diminishes over time;

(e) controlling the relative humidity within the interior of the enclosure;

(f) adhering sealant particles from fog flowing out of enclosure leaks to surfaces adjacent to leaks and to other particles to form a seal; and (g) monitoring the pressure differential across the enclosure and flow into the enclosure to determine the progress of the sealing process;

(h) wherein sealant particles that do not form a seal will not adhere to interior surfaces of the enclosure or to other particles after a period of time.

23. The method of claim 22, further comprising controlling the size of the sealant particles to have a mean particle diameter within the range of approximately 2 microns to approximately 20 microns.

24. The method of claim 22, said sealant composition further comprising an indicator, said indicator selected from the group consisting of colored dyes, colored fibers, fluorescent dyes and phosphorescent dyes, wherein the location of the seals in the enclosure are identified by the indicator.

25. The method of claim 24, further comprising applying an additional layer of sealant on leaks identified by the presence of the indicator.

* * * * *